US006738071B2

(12) United States Patent
Barmettler

(10) Patent No.: US 6,738,071 B2
(45) Date of Patent: May 18, 2004

(54) DYNAMICALLY ANTI-ALIASED GRAPHICS

(75) Inventor: James W Barmettler, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 230 days.

(21) Appl. No.: 10/046,380

(22) Filed: Oct. 25, 2001

(65) Prior Publication Data

US 2003/0080969 A1 May 1, 2003

(51) Int. Cl.[7] .................................................. G09G 5/00
(52) U.S. Cl. ....................................................... 345/611
(58) Field of Search ........................ 345/611, 156 FOR; 358/3.2, 3.26; 382/269

(56) References Cited

U.S. PATENT DOCUMENTS

| 5,519,823 | A | * | 5/1996 | Barkans ..................... 395/143 |
| 5,982,381 | A | * | 11/1999 | Joshi et al. ................. 345/435 |
| 6,426,755 | B1 | * | 7/2002 | Deering ....................... 345/851 |
| 2002/0122036 | A1 | * | 9/2002 | Sasaki ......................... 345/422 |
| 2003/0107583 | A1 | * | 6/2003 | Fushiki et al. .............. 345/611 |

OTHER PUBLICATIONS

Foley et al., "Computer Graphics: Principles and Practice", 1990, Addiso–Wesley, Second Edition, pp. 754–755.*

* cited by examiner

Primary Examiner—Matthew C. Bella
Assistant Examiner—G. F. Cunningham

(57) ABSTRACT

An alpha channel layer is generated by an opacity value that is assigned to each pixel of the image layer. The opacity value is represented by N bits/pixel and is generated by the expression $j/(2^N-1)$ where j is a value that represents the binary value of the N bits. When the image is to be rendered on the new background, the background layer is combined with the image and alpha channel layers to generate the updated, final RGB values for each pixel. These updated RGB components are expressed as $R_{final}=R(p)*O+R(p_{background})*(1-O)$, $G_{final}=G(p)*O+G(p_{background})*(1-O)$, and $B_{final}=B(p)*O+B(p_{background})*(1-O)$ where O is the opacity value of image pixel p and $p_{background}$ is the background pixel associated with the image pixel p.

21 Claims, 4 Drawing Sheets

-PRIOR ART-

-PRIOR ART-

DYNAMICALLY ANTI-ALIASED GRAPHICS

FIELD OF THE INVENTION

The present invention relates generally to the presentation of computer graphics. Particularly, the present invention relates to the dynamic anti-aliasing of computer graphics.

DESCRIPTION OF THE RELATED ART

Anti-aliasing on a display device, such as a computer monitor or printer where the display surface is divided into a rectangular array of pixels, solves the problems inherent with drawing lines and curves. Anytime a line changes direction, a jagged stair-step pattern occurs.

A typical prior art jagged edge of a letter is illustrated in FIG. 1. This figures shows that as the bottom of the "J" curves upward, the square pixels produce a jagged appearance. This problem can be reduced with fonts by using an anti-aliasing process on the font.

Anti-aliasing works by blending foreground and background colors near jagged edges. This "softens" the edges of the font when the lines change direction. FIG. 2 illustrates a typical prior art anti-aliasing of a font. In this figure, it can be seen that the black text color is "averaged" with the background color to reduce the appearance of the jagged edge.

The anti-aliasing color that was generated for FIG. 2 is embedded in the graphic description and becomes part of the color description information for that graphic. When the graphic is moved to another background, the same anti-aliasing colors are used. If the background is comprised of a color or colors that are different than the original color, the edges of the graphic will not blend well with the new background color and the graphic may end up with an undesirable appearance along the edges. There is a resulting need for a process for anti-aliasing a graphic that enables the graphic to be moved to various background colors without affecting the appearance of the graphic.

SUMMARY OF THE INVENTION

The present invention encompasses a method and apparatus for anti-aliasing a graphic image. An image layer is generated for the graphic image, the image layer comprising a plurality of pixels, each pixel including a red, a green, and a blue component. An opacity value is assigned to each pixel of the plurality of pixels in order to generate an alpha channel layer. The alpha channel layer is stored with the image layer.

DETAILED DESCRIPTION OF THE PREFERRED EMBODIMENT

The process of the present invention enables the dynamic anti-aliasing of graphics on a computer monitor. A graphic using the format of the present invention can be placed on any color of background while still exhibiting the smooth line characteristic of anti-aliasing. This is accomplished by storing anti-aliasing information for each pixel of the graphic.

Figure 1:
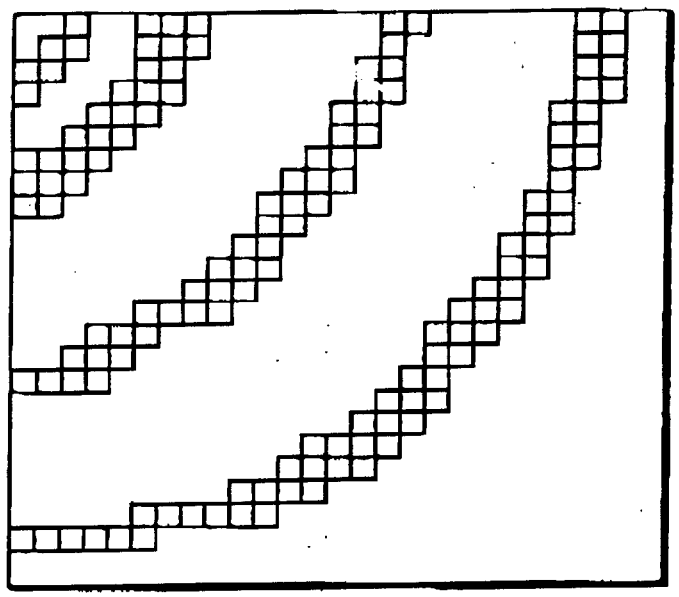
FIG. 1 shows a typical prior art graphic with jagged curves.
Figure 2:
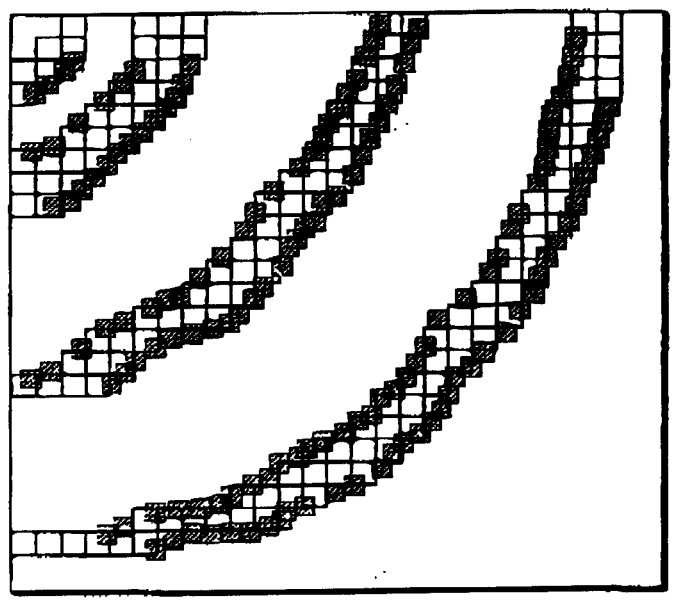
FIG. 2 shows a typical prior art graphic that has been anti-aliased using embedded background colors.
Figure 3:
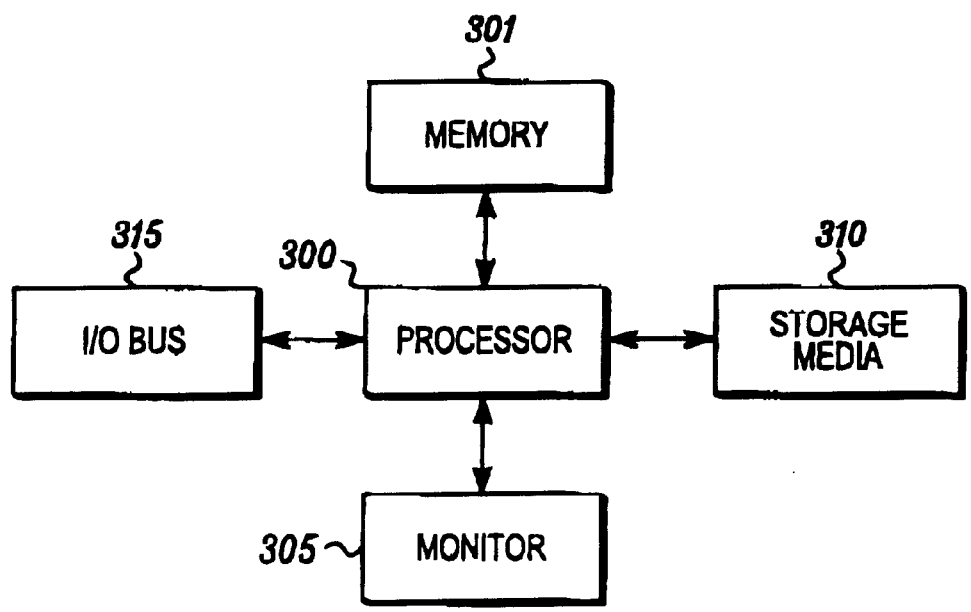
FIG. 3 shows a block diagram of a typical computer that renders anti-aliased graphics of the present invention.

The anti-aliasing processes of the present invention works on any computer or graphics workstation. FIG. 3 illustrates only one example of such a computer. This computer is typically comprised of a processor or other controller (300) that runs the operating system and anti-aliasing processes. An example of such a processor is INTEL'S PENTIUM processor or MOTOROLA'S POWERPC.

The graphics information is stored on the storage media (310). This storage media (310) may be comprised of a hard disk, a floppy disk, a ZIP disk, or any other type of storage media. The processor (300), under control of the operating system and the graphics rendering software, creates and stores the graphics on the storage media (310).

Memory (301), such as random access memory (RAM) or read only memory (ROM), is used to temporarily store graphics information retrieved from the permanent storage media (310) by the processor (300). This memory (301) includes the video memory used by the processor (300) to store the information that is displayed on the computer monitor (305). This memory block (301) also includes the ROM that stores the operating instructions used by the controller (300).

The computer illustrated in FIG. 3 communicates with printers and other devices through a bus (315). The bus may be a Universal Serial Bus, a parallel bus, a serial bus, or any other type of bus structure.

The computer of FIG. 3 is for illustration purposes only. The computer running the processes of the present invention may be substantially more complex than that illustrated in FIG. 3.

Figure 4:
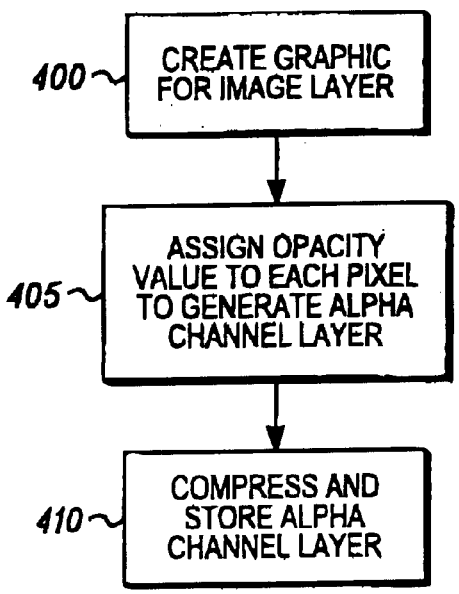
FIG. 4 shows a flowchart for an anti-aliasing process in accordance with the present invention for storing anti-aliased graphics.

FIG. 4 illustrates a dynamic anti-aliasing process for creating and storing graphics of the present invention. The final graphic image to be displayed is the result of combining three layers. These layers are the image layer, the background layer, and an alpha channel layer. The image layer contains the basic image that is generated by the graphics-generating program. The background layer contains the information pertaining to the background over which the image is to be drawn. The background layer is not part of the final image file but is used in the dynamic anti-aliasing of the image as it is rendered. The alpha channel layer is digital data that contains the opacity of each pixel of the image.

The process begins by creating a graphic for the image layer (step 400). This can be accomplished using any graphic generating programs available. For example, CANVAS or ADOBE PHOTOSHOP are two such programs.

The graphics program, under the guidance of the graphics artist, creates the graphic such that each pixel of the graphic is designated by a color. This pixel information is stored in memory in the form of red, green, and blue (RGB) components for each pixel. Since red, green, and blue are the primary light colors, the RGB values for each pixel determine the amount of each color in a particular pixel. The RGB values are well known in the graphics art and are not discussed further.

The RGB information can later be read out of memory and displayed or printed. The colors available depend on the computer and the monitor on which the graphic is displayed. In one embodiment, the computer/monitor are capable of displaying 32-bit color for each pixel. This would provide millions of colors for each pixel. Alternate embodiments may provide 8, 16, or other quantities of bits for each pixel.

The alpha channel layer specifies the opacity of each pixel in the image layer. The final image is the result of rendering each pixel of the image with the correct opacity over the background layer. An opacity value of 1 indicates that the image pixel is to be rendered at full intensity and the background does not contribute to the pixel. An opacity value of 0 indicates that the image is transparent and the background is to be rendered at full intensity. Values between 1 and 0 represent an intermediate opacity.

The opacity value is represented using N bits. Each alpha layer pixel is assigned a value, j, between 0 and $2^N-1$ (step 405). The value j thus represents the binary value of N bits. The opacity value for each pixel is represented by:

$$\text{opacity} = \frac{j}{(2^N - 1)}.$$

Using this equation for the opacity value, the alpha channel layer is represented using N bits per pixel. The alpha channel layer is then compressed and stored (step 410).

In the preferred embodiment, this layer can be compressed using run length encoding in order to reduce the size of the file resulting from the opacity value for each pixel. Run length encoding is well known in the art and is not discussed further here.

Alternate embodiments use other forms of compression in order to reduce the file size. Since compression is not required for proper operation of the present invention, another embodiment stores the image file in an uncompressed state.

The alpha channel layer, in the preferred embodiment, is stored at the end of the graphics file after the image layer information. Alternate embodiments may store the alpha channel layer in other locations. For example, the anti-aliasing for each pixel may be stored along with the image information for that pixel.

Figure 5:
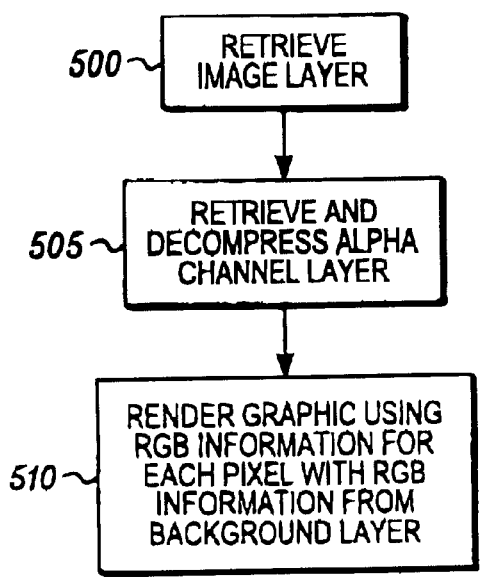
FIG. 5 shows a flowchart for an anti-aliasing process in accordance with the present invention for rendering anti-aliased graphics.

FIG. 5 illustrates a flowchart for the dynamic anti-aliasing process of the present invention for rendering anti-aliased graphics. In this process, the image layer, the background layer, and the alpha channel layer from above are combined to compute each pixel's final value as it is rendered.

The image layer is first retrieved (step 500) from memory or any other location that it is stored. The alpha channel information is also retrieved from the end of the file (step 505). If the alpha channel was compressed, it is decompressed at this time. The image layer, the alpha channel layer, and the new background information over which the stored image is to be rendered are then combined as discussed subsequently in order to render the graphic (step 510).

The RGB information for each pixel must be determined from the combination of the three layers in order to render the graphic. In the subsequent discussion, "O" represents the opacity value of an image pixel subsequently referred to as "p". R(p) is the red component of pixel p, G(p) is the green component of pixel p, B(p) is the blue component of pixel p. Further, $p_{background}$ is the background pixel corresponding to the image pixel p. The updated RGB components of the final pixel to be rendered, therefore, are expressed as:

$$R_{final}=R(p)*O+R(p_{background})*(1-O),$$

$$G_{final}=G(p)*O+G(p_{background})*(1-O), \text{ and}$$

$$B_{final}=B(p)*O+B(p_{background})*(1-O).$$

As is well known in the art, the RGB information for each pixel is then written to a video random access memory (RAM) area of the computer. The RGB information is then read out of the video RAM by the computer's video controller or processor and displayed on the monitor or a printer.

Figure 6:
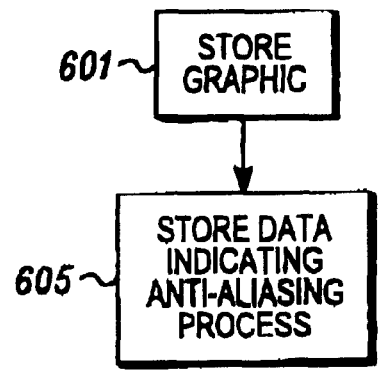
FIG. 6 shows a flowchart for an alternate embodiment anti-aliasing process in accordance with the present invention for storing anti-aliased graphics.

FIG. 6 illustrates a flowchart for an alternate embodiment of the anti-aliasing process for storing anti-aliased graphics. This process stores, with the existing image layer information, a flag or other information that indicates which one of a particular anti-aliasing process is to be performed on the image as it is rendered. This process assumes that there are a number of anti-aliasing processes stored in the computer between which the anti-aliasing process of the present invention can select.

The embodiment of FIG. 6 has the advantage of being able to use whichever anti-aliasing process would be best for a certain situation. For example, if the graphic is to be rendered on the same color background as the one upon which it was generated, the prior art anti-aliasing process can be used. If file size is not a primary concern, the preferred embodiment process illustrated in FIGS. 4 and 5 may be used.

Referring to FIG. 6, the alternate embodiment process begins with the creation and storing of the graphic (step 601). As in the preferred embodiment, the RGB information for the image layer is stored on a pixel-by-pixel basis.

In this embodiment, the anti-aliasing information or flag is only stored (step 605) once for the entire graphics file. This information would typically be stored at the beginning of the file such that the processor reading the graphics information knows initially which anti-aliasing process to use in rendering the graphic. The flag or information may be the name of the process to indicate to the computer's processor which anti-aliasing process to access off the hard-drive.

Figure 7:
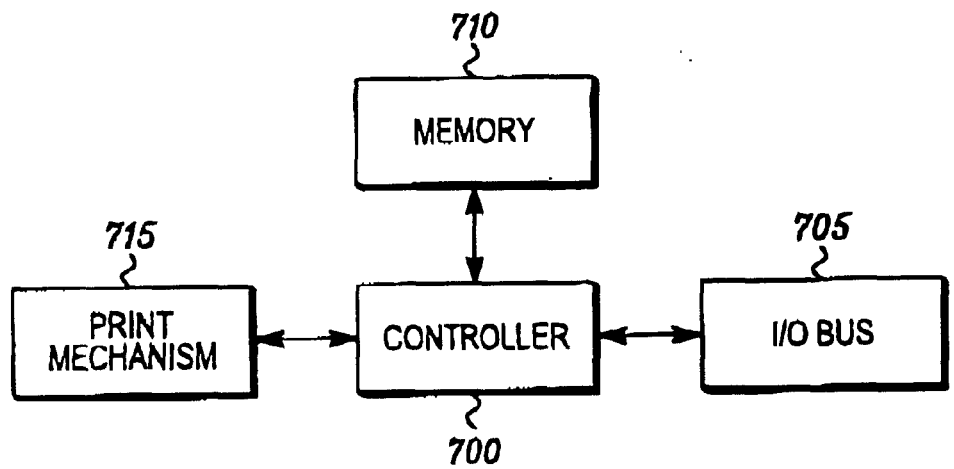
FIG. 7 shows a block diagram of a printer in accordance with the present invention.

FIG. 7 illustrates a block diagram of a printer that uses the processes of the present invention. The printer is comprised of a controller or processor (700) that controls the operation of the printer. The controller (700) communicates with a computer or other such device through an I/O bus (705). This bus structure may be a USB, a parallel bus, a serial bus, or any other type of bus structure. The printer and a computer connected through the bus structure form a printing system.

Memory (710), such as RAM or ROM, is used to temporarily store graphics information retrieved from a computer by the processor (700). This memory (710) includes the ROM that stores the instructions used by the controller (700) as well as the RAM in which print jobs are stored while being printed.

A print mechanism (715), such as an inkjet pen or laser print mechanism, is coupled to the controller (700). The print mechanism is responsible for printing the ink or toner on print media in response to instructions from the controller (700).

In review, the anti-aliasing process in accordance with the present invention provides dynamic anti-aliasing of graphics such that a graphic designed on one color of background can be rendered on another background color without undesirable effects. In a computer, or computer system, this is accomplished by the processor storing in the alpha channel layer the weight to use for averaging foreground and background colors along the edge of the graphic. For purposes of claim construction, the functions of generating an image layer for the graphic image; assigning an opacity value to each pixel; and storing the alpha channel layer with the image layer are also performed by the processor or processors in a computer, computer system, or printer. Similarly, the functions of retrieving the image layer; retrieving the alpha channel layer; generating components of each pixel and of rendering each pixel is also performed by the processor or processors in a computer, computer system, or printer.

What is claimed is:

1. A method for anti-aliasing a graphic image comprising the steps of:
   generating an image layer for the graphic image, the image layer comprising a plurality of pixels, each pixel including a red, a green, and a blue component;
   assigning an opacity value to each pixel of the plurality of pixels in order to generate an alpha channel layer;
   storing the alpha channel layer with the image layer; and
   dynamically modifying the aloha channel layer to change the red, green, and blue components of each pixel of the image layer each time a different background layer is combined with the image layer.

2. The method of claim 1 and further including the step of compressing the alpha channel layer prior to the step of storing.

3. The method of claim 2 wherein the step of compressing comprises using a run length encoding to compress the alpha channel layer.

4. The method of claim 1 wherein the alpha channel layer is represented by N bits per pixel and the opacity value represents the binary value of the N bits.

5. The method of claim 4 wherein the opacity value is represented by $j/(2^N-1)$ where j is between 0 and 2N −1 and represents the binary value of the N bits.

6. The method of claim 1 and further including the steps of:
   retrieving the image layer;
   retrieving the alpha channel layer;
   generating updated red, green, and blue components of each pixel of the image layer in response to the alpha channel layer and a background layer; and
   rendering each pixel in response to its updated red, green, and blue components.

7. A method for anti-aliasing a graphic image comprising the steps of:
   generating an image layer for the graphic image, the image layer comprising a plurality of pixels, each pixel having a red, a green, and a blue component;
   assigning an opacity value to each pixel of the plurality of pixels in order to generate an alpha channel layer;
   dynamically modifying the alpha channel layer to change the red, green, and blue components of each pixel of the image layer each time a different background layer is combined with the image layer;
   generating updated red, green, and blue components of each pixel of the image layer in response to the alpha channel layer and the background layer; and
   rendering each pixel in response to its updated red, green, and blue components.

8. The method of claim 7 wherein the step of storing comprises the step of storing the alpha channel layer in a file along with the image layer on a computer hard drive.

9. The method of claim 8 wherein the alpha channel layer is stored at the end of the file after the image layer.

10. A method for rendering an anti-aliased graphic over a background layer, the graphic being stored with an image layer including red, green, and blue components and an alpha channel layer including opacity information for each pixel of the image layer, the method comprising the steps of:
    retrieving the image layer;
    retrieving the alpha channel layer;
    dynamically modifying the alpha channel layer to change the red, green, and blue components of each pixel of the image layer each time a different background layer is combined with the image layer;
    generating updated red, green, and blue components of each pixel of the image layer in response to the alpha channel layer and the background layer; and
    rendering each pixel in response to its updated red, green, and blue components.

11. The method of claim 10 wherein the step of generating updated red ($R_{final}$) green ($G_{final}$), and blue ($B_{final}$) components comprises the expressions: $R_{final}=R(p)*O+R(P_{background})*(1-O)$, $G_{final}=G(p)*O+G(P_{background})*(1-O)$, and $B_{final}=B(p)*O+B(P_{background})*(1-O)$ where O is an opacity value of an image pixel p and $P_{background}$ is a background layer pixel associated with the image pixel p.

12. The method of claim 11 wherein the opacity value O is generated by $J/(2N-1)$ where j is a value between 0 and $2^N-1$ and represents a binary value of N bits in length such that the opacity is between 0 and 1 inclusive.

13. The method of claim 12 wherein an opacity value of 1 indicates that the image pixel, p, is rendered at full intensity and an opacity value of 0 indicates that the background layer pixel, $P_{background}$, is rendered at full intensity.

14. A computer that generates an anti-aliased graphic image, the computer comprising:
    a monitor that displays the anti-aliased graphic image on a background layer;
    a storage media that stores the anti-aliased graphic image in a format that comprises an image layer and an alpha channel layer, the image layer comprising a plurality of pixels each including an original red, green, and blue component, the alpha channel layer comprising an opacity value assigned to each pixel of the image layer, the opacity value being between 0 and 1 inclusive; and
    a controller, coupled to the monitor and the storage media, that renders the graphic image on the monitor by dynamically modifying the alpha channel layer to change the red, green, and blue components of each pixel of the image layer each time a different background layer is combined with the image layer and then generating updated red, green, and blue components for a pixel to be rendered, the updated red, green, and blue component for each pixel being generated in response to the alpha channel layer, the background layer, and the original red, green, and blue components.

15. The computer of claim 14 wherein the opacity value is expressed as $j/(2^N-1)$ where j is a value between 0 and $2^N-1$ that represents the N bit binary value of the opacity value.

16. The computer of claim 14 wherein the updated red ($R_{final}$), green ($G_{final}$), and blue ($B_{final}$) components comprise the expressions: $R_{final}=R(p)*O+R(P_{background})*(1-O)$, $G_{final}=G(p)*O+G(P_{background})*(1-O)$, and $B_{final}=B(p)*O+B$ $(P_{background})*(1-O)$ where O is the opacity value of an image pixel p and $P_{background}$ is a background layer pixel associated with the image pixel p.

17. A system for generating an anti-aliased graphic image, the system comprising:

means for generating an image layer for the graphic image, the image layer comprising a plurality of pixels, each pixel including a red, a green, and a blue component;

means for assigning an opacity value to each pixel of the plurality of pixels in order to generate an alpha channel layer; and means for storing the alpha channel layer with the image layer;

means for dynamically modifying the alpha channel layer to chance the red, green, and blue components of each pixel of the image layer each time a different background layer is combined with the image layer.

18. A system for rendering an anti-aliased graphic over a background layer, the graphic being stored with an image layer including red, green, and blue components and an alpha channel layer having opacity information for each pixel of the image layer, the method comprising the steps of:

means for retrieving the image layer;

means for retrieving the alpha channel layer;

means for dynamically modifying the alpha channel layer to change the red, green, and blue components of each pixel of the image layer each time a different background layer is combined with the image layer;

means for generating updated red, green, and blue components of each pixel of the image layer in response to the alpha channel layer and the background layer; and means for rendering each pixel in response to its updated red, green, and blue components.

19. A printing system that generates an anti-aliased graphic image, the printing system comprising:

memory that stores the anti-aliased graphic image in a format that comprises an image layer and an alpha channel layer, the image layer comprising a plurality of pixels each including an original red, green, and blue component, the alpha channel layer comprising an opacity value assigned to each pixel of the image layer, the opacity value being between 0 and 1 inclusive; and a controller, coupled to the memory, that renders the graphic image on print media by dynamically modifying the alpha channel layer to change the red, green, and blue components of each pixel of the image layer each time a different background layer is combined with the image layer and then generating updated red, green, and blue components for a pixel to be printed, the updated red, green, and blue component for each pixel being generated in response to the alpha channel layer, the background layer, and the original red, green, and blue components.

20. The printing system of claim 19 wherein the opacity value is expressed as $j/(2^n-1)$ where j is a value between 0 and $2^n-1$ that represents the N bit binary value of the opacity value.

21. The printing system of claim 19 wherein the updated red ($R_{final}$), green ($G_{final}$), and blue ($B_{final}$) components comprise the expressions: $R_{final}=R(p)*O+R(p_{background})*(1-O)$, $G_{final}=G(p)*O+G(p_{background})*(1-O)$, and $B_{final}=B(p)*O+B(P_{background})*(1-O)$ where O is the opacity value of an image pixel p and $P_{background}$ is a background layer pixel associated with the image pixel p.

* * * * *

UNITED STATES PATENT AND TRADEMARK OFFICE
CERTIFICATE OF CORRECTION

PATENT NO. : 6,738,071 B2
DATED : May 18, 2004
INVENTOR(S) : Barmettler

It is certified that error appears in the above-identified patent and that said Letters Patent is hereby corrected as shown below:

Column 5,
Line 26, delete "aloha" and insert therefor -- alpha --.

Column 7,
Line 12, delete "and".

Signed and Sealed this

Fourteenth Day of December, 2004

JON W. DUDAS
*Director of the United States Patent and Trademark Office*